United States Patent [19]

Grallert et al.

[11] Patent Number: 4,651,194

[45] Date of Patent: Mar. 17, 1987

[54] ARRANGEMENT FOR MULTIPLEXING LUMINANCE AND CHROMINANCE CODE WORDS OF VARIABLE LENGTH

[75] Inventors: Hans-Joachim Grallert, Groebenzell; Werner Liegl, Schwabhausen, both of Fed. Rep. of Germany

[73] Assignee: Siemens Aktiengesellschaft, Berlin and Munich, Fed. Rep. of Germany

[21] Appl. No.: 684,295

[22] Filed: Dec. 20, 1984

[30] Foreign Application Priority Data

Dec. 22, 1983 [DE] Fed. Rep. of Germany ....... 3346514

[51] Int. Cl.$^4$ .......................................... H04N 11/06
[52] U.S. Cl. ........................................ 358/13; 375/27
[58] Field of Search ................. 358/13, 133, 135, 260, 358/261; 375/25, 27, 30, 31, 33, 34; 370/118; 332/11 D

[56] References Cited

U.S. PATENT DOCUMENTS

| 3,761,613 | 9/1973 | Limb | 375/25 |
| 3,996,607 | 12/1976 | Heitmann | 358/13 |
| 4,023,199 | 5/1977 | Netravali et al. | 358/13 |
| 4,141,034 | 2/1979 | Netravali et al. | 358/13 |
| 4,335,393 | 6/1982 | Pearson | 358/11 |
| 4,491,953 | 1/1985 | Bellisio et al. | 375/27 |
| 4,517,596 | 5/1985 | Suzuki | 358/133 |
| 4,569,058 | 2/1986 | Grallert | 375/27 |

OTHER PUBLICATIONS

Klutz et al., "Test System for Digital TV Transmission", *Electrical Communication*, vol. 51, No. 2, pp. 100–106, 1976.

Review of Electrical Communication Laboratories, vol. 27, No. 11–12, Nov./Dec. 1979, Tokyo–K. Sawada et al, "NTSC Color TV Component Separation DPCM Coding System", pp. 1078 through 1094.

Review of the Electrical Communication Laboratories, vol. 27, 1979, Heft 11/12, pp. 1095 through 1112.

NTG–Fachberichte 84, "Neue Aspekte der Informations–und Systemtheorie", VDE–Verlag GmbH, Berlin Offenbach, 1983, pp. 219 through 225.

*Primary Examiner*—Michael A. Masinick

[57] ABSTRACT

An arrangement for transmission of television composite signals contains coders which convert luminance component Y, and chrominance difference components U, and V of a television signal into variable-length code words. These are interlaced in a multiplexer in pulse frames by assignment to fixed locations. At a receive side, a time-division multiplex signal formed is in turn separated in a demultiplexer. Decoders reconvert the variable-length code words into the Y, U, and V components. The luminance and chrominance components can be reliably separated at the receive side due to the assigning of fixed locations in the pulse frame, these components being reliable separated even when the word synchronization of the individual components is lost.

3 Claims, 8 Drawing Figures

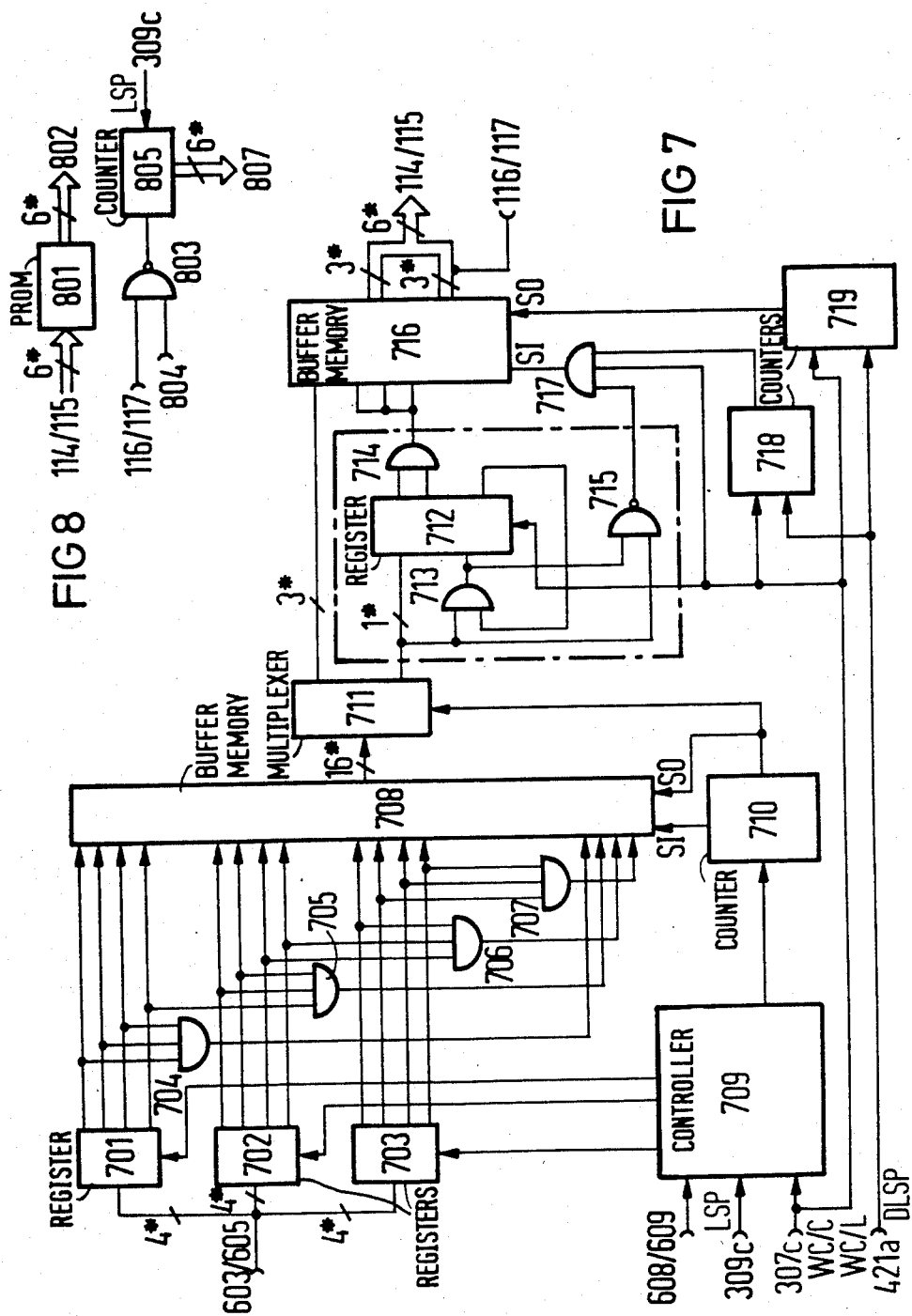

4,651,194

ARRANGEMENT FOR MULTIPLEXING LUMINANCE AND CHROMINANCE CODE WORDS OF VARIABLE LENGTH

BACKGROUND OF THE INVENTION

The invention relates to an arrangement for the transmission of synchronous television composite signals separated into luminance and chrominance component signals. Coders are provided which convert the luminance signal y and chrominance signals u, v into variable-length code words. Decoders are also provided which reconvert the variable-length code words.

A coding with variable code word lengths is known from the NTG-Fachberichte 84, "Neue Aspekte der Informations- und Systemtheorie", VDE-Verlag GmbH, Berlin-Offenbach, 1983, pages 219 through 225, incorporated herein by reference. Given such a coding, the word synchronization can be lost given the occurrence of transmission errors. This means that the code words are no longer separable at the receive side. If such coded luminance and chrominance signals were interlaced word-wise, then the consequences of a bit error would affect both signal types given the occurrence of a bit error.

A transmission system for television signals is known from the reference "Review of the Electrical Communication Laboratories", Vol. 27, No. 11–12, Nov.–Dec. 1979, pages 1095–1112, particularly FIG. 12, incorporated herein by reference. Given this system, a first quantizer generates four-place or eight-place DPCM code words depending on the coding rule. The changeover controller at the transmit side counts the eight-place DPCM code words appearing within a measuring time span and engages a different quantizer after it has reached a certain number, this different quantizer generating four-place DPCM code words. Given this system, a switch is provided to allow the quantizer to have a coarser characteristic given a pending buffer overflow.

A further transmission system is known from the German published application No. OS 33 14 384, incorporated herein by reference, wherein a first quantizer for code words having a length of up to six bits and a second quantizer for code words having a length of three bits are disposed in a DPCM loop. The quantizer for the next PCM code word pending at the input is selected after every switchover on the basis of the number of memory locations still existing.

SUMMARY OF THE INVENTION

An object of the invention is to specify a type of interlacing wherein bit errors have a respective effect only either on the luminance or on the chrominance signal.

Proceeding from an arrangement of the type initially described, this object is achieved by providing a multiplexer at the transmit side which, controlled by the coders, interlaces the luminance and chrominance signals in pulse frames which alternatingly contain one or more fixed locations for both signal types. A demultiplexer, which in turn separates the chrominance and luminance signals, is provided at the receive side.

The invention is based on the perception that bit errors in one signal type do not influence the other signal type because both signal types are separated, dependent on the number of bits received at the decoders.

It is preferable if the sampling rate of the luminance signals is a whole multiple m/n of the sampling rate of the chrominance signals, and if a pulse frame in which n bit chrominance signals following every m bit luminance signals is selected.

BRIEF DESCRIPTION OF THE DRAWINGS

FIG. 7 shows a demultiplexer unit in detail for luminance or chrominance color difference signals; and FIG. 8 shows a code converter in detail for a decoder for luminance or chrominance color difference signals.

DESCRIPTION OF THE PREFERRED EMBODIMENTS

Figure 1:
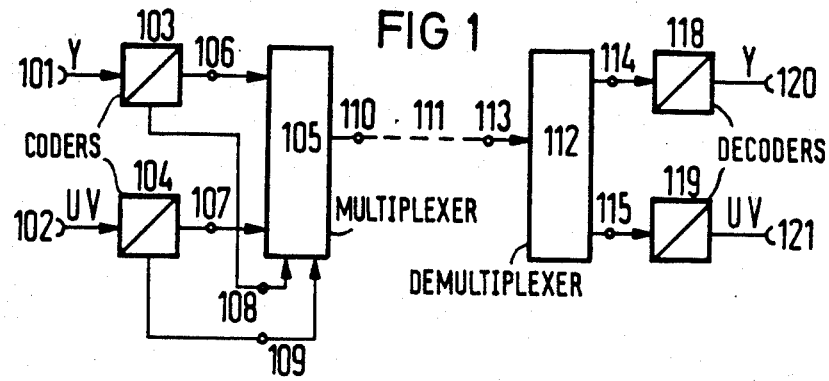
FIG. 1 shows a schematic illustration of the invention.

In the Figures, the reference numerals always have three places. The first digit indicates the figure in which the reference numeral was employed for the first time. Numerals provided with an * indicate how many lines are present in parallel.

The arrangement of FIG. 1 contains an input 101 for a Y-signal, an input 102 for a U-signal, and a V-signal in alternate fashion, coders 103 and 104, a multiplexer 105, a transmission link 111, a demultiplexer 112, decoders 118 and 119, an output 120 for the Y-signal, and an output 121 for the U-signal and V-signal. The transmission link is composed of four parallel lines.

A luminance signal present at the input 101 is converted into variable-length code words in the coder 103. The same occurs with the chrominance color difference signals U and V in the coder 104 in alternating fashion. Both types of variable-length code words are supplied to the inputs of the multiplexer 105.

Figure 2:
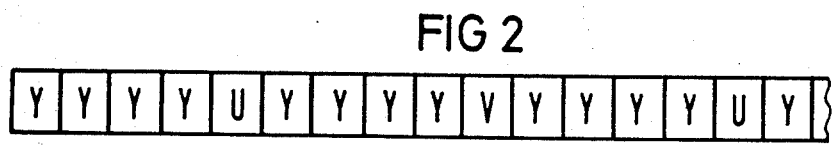
FIG. 2 shows a pulse frame for a time-division multiplex signal to be transmitted with the arrangement of FIG. 1.

The pulse frame of the multiplexer is organized in accordance with FIG. 2. It applies to each of the four parallel lines 111. Four luminance bits Y are followed either by a chrominance bit U or by a chrominance bit V. The multiplexer 105 is thus controlled by the coder 103 and 104. The word boundaries of the luminance code words can lie at an arbitrary location in the quad blocks of the Y-bits.

The separation of the luminance and chrominance color difference signals at the receive side occurs in the demultiplexer 112. The decoders 118 and 119 reconvert the variable-length code words into Y-signals at the output 120 and into U and V signals at the output 121.

In this fashion, the luminance and the chrominance components can be reliably separated at the receive side, even when the word synchronization of the individual components is lost. A cross-talk of errors in the luminance channel onto the chrominance channel and vice versa is not possible.

Buffer memories, for example for the compensation of irregular data streams from the coders 103 and 104, need only have a minimum length given the interlacing method of the invention.

Figure 3:
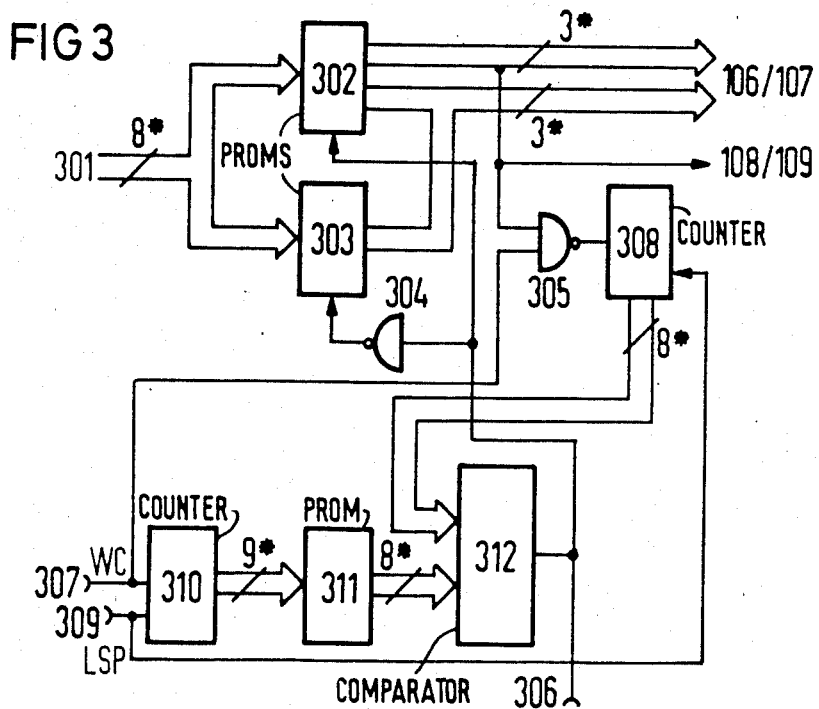
FIG. 3 shows a code converter in detail for a coder for luminance and chrominance color difference signals.

FIG. 3 shows a code converter which follows a DPCM loop comprising two quantizers as is disclosed in the aforementioned publications "Review of the Electrical Communication Laboratories" or German No. OS 33 14 384, both incorporated herein by reference.

The arrangement contains programmable read-only memories (PROMs) 302 and 303 of the type 24S41, a counter 308 of two integrated circuits of the type 74LS161, an inverter 304, and a NAND gate 305. It further contains a switchover controller comprising counter 310 constructed with three integrated circuits 74LS161, a programmable read-only memory (PROM) 311 of the type 28S42, and a comparator 312 in the form of an integrated circuit of the type 74LS684.

The code words coming from the DPCM loop are present at the input 301 and should be 8-bit code words here. These are converted into a 3-bit or 6-bit code word in the programmable read-only memory 302 when they are derived from the one quantizer, or are converted into a 3-bit code word in the programmable read-only memory 303 when they are derived from the other quantizer.

The output 106/107 is composed of data lines and a signalling line 108/109 which informs the following circuits whether the data word adjacent to the data lines was converted in the programmable read-only memory 302 or in the programmable read only memory 303.

At the beginning of a picture line, the counter 308 is reset by a line sync pulse LSP adjacent to the input 309. The counter 308 counts the number of 6-bit code words with the word clock WC adjacent to the input 307 and the NAND gate 305. The counter output always forwards the number of 6-bit code words already coded in the current line to the comparator 312.

The counter 310 counts the number of code words already coded in a picture line. It is reset at the beginning of every picture line by the line sync pulse LSP adjacent to the input 309 and counts with the assistance of the word clock WC adjacent to the input 307. The output of the counter 310 is connected to the input of the programmable read-only memory 311 whose output indicates how many 6-bit code words are permitted up to the current picture element in the picture line. The comparator 312 compares the number of permitted 6-bit code words to the number of code words that have actually occurred at the output of the counter 308. When their number is greater than that at the output of the programmable read-only memory 311, then the comparator 312 outputs a signal to the terminal 306. This signal causes the switchover of switches in the DPCM loop over to the other quantizer. At the same time, it informs the programmable read-only memories 302 and 303 that the next code word is to be coded with three bits.

Figure 4:
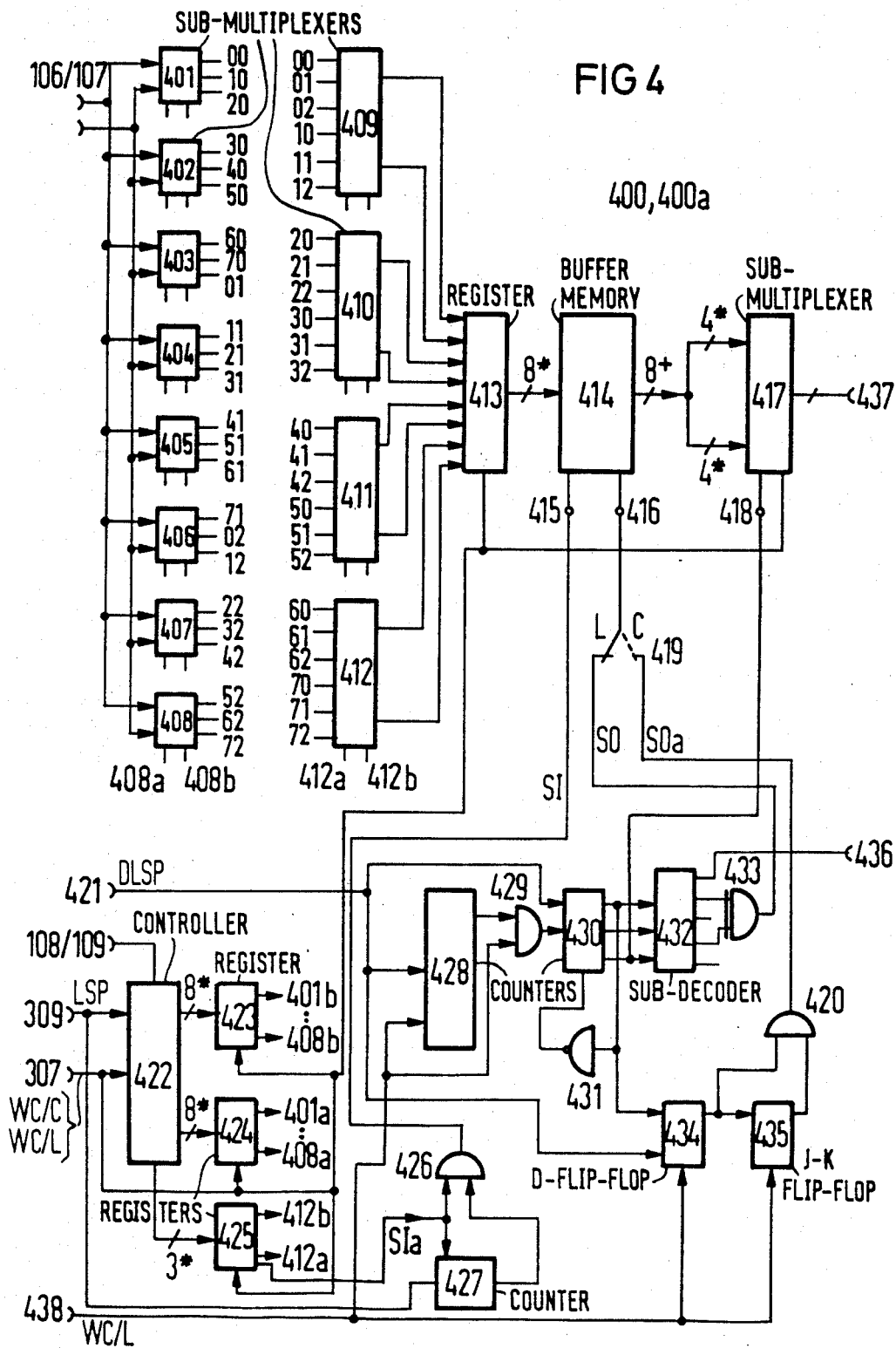
FIG. 4 shows a multiplexer unit in detail for luminance or chrominance color difference signals.

FIG. 4 shows a multiplexer part 400, 400a for luminance or chrominance color difference signals. One multiplexer part is required for a signal type for the overall multiplexer 105. During operation, the multiplexer parts for the two signal types differ since the frequency of the word clock WC/C of the chrominance color difference signal corresponds to one-fourth the frequency of the word clock WC/L of the luminance signal.

The multiplexer part contains eight sub-multiplexers 401 through 408 of the type 74LS 399. The SEL (select) input of each sub-multiplexer 401 through 408 is provided with its reference numeral and an 'a'. The reference character of the respective clock input is the reference numeral of the sub-multiplexer with a 'b'. The arrangement further contains four sub-multiplexers 409 through 412 of the type 74LS153. The SEL inputs of these sub-multiplexers 409 through 412 respectively bear, the reference numeral of the corresponding sub-multiplexer with an 'a' and, 'b' where the MSB (most significant bits) of the SEL inputs bear reference characters with an 'a'. The arrangement further contains a register 413 of the 74LS273 type, a buffer memory (FIFO) (first-in first-out memory) 414 composed of two integrated circuits TDC1030 of the TRW Company, and of a sub-multiplexer 417 of the type 74LS399.

A controller 422 is also provided which is composed of three PROMs of the type 74S288, two registers 423 and 424 of the type 74LS273, a register 425 of the type 74LS174, a counter 427 comprising two integrated circuits of the type 74LS161, and of an AND GATE 426.

A read controller contains a counter 428 composed of three integrated circuits of the type 74LS161, AND gates 420 and 429, a counter 430 74F163, an inverter 431, a sub-decoder 432 74F138, an exclusive-OR gate 433, a D-flip-flop 434, and a J-K-flip-flop 435. One input 438 always serves for the reception of a luminance word clock WC/L.

Finally, a solder strap 419 is also provided by means of which re-soldering between an operation for luminance signals L and an operation for chrominance color difference signals C can be undertaken.

A total of 3-bits of 6-bit code words are applied in parallel to the sub-multiplexers 401 through 408 at the input 106/107. The controller 422 is informed via the input 108/109 whether a 3-bit or 6-bit code word is presented there. The controller generates clock and selection signals at the registers 423 and 424 for the sub-multiplexers 401 through 408 so that the the 3-bit and 6-bit code words reside in the registers of the sub-multiplexers 401 through 408 as a continuous sequence. The outputs of these registers are connected in a specific sequence to the inputs of the sub-multiplexers 409 through 412. These connections are referenced with two-place numerals. The SEL inputs 409b through 412b and 409a through 412a are driven in common by the register 425 such that the 3-bits of the 6-bit code words are combined into an 8-bit parallel data stream which is intermediately stored in the register 413. When an 8-bit code word can be formed from 3-bit or 6-bit code words, then the controller emits a shift-in pulse SI at the output of the AND gate 426, said pulse SI transferring the currently present 8-bit code word into the buffer memory 414 via the terminal 415.

The registers 423 through 424 serve to keep the signals they are to output stable during the rise times of the PROM outputs. The pulses SIa are counted in the counter 427. When the maximum number of pulses SI has been reached in a line, further pulses SI are no longer output. A line start pulse at the input 309 resets the counter 427.

The input for the word clock either for luminance WC/L or for chrominance WC/C again carries the reference numeral 307 in this case.

An 8-bit code word is applied to the output of the buffer memory 414 by a pulse SO or SOa at the input 416. Since the following circuits, for example, require 4 bits in parallel for data protection, the 8-bit code word coming from the buffer memory 414 is divided into two 4-bit code words via the sub-multiplexer 417. With the assistance of the signal at the input 418, 4 bits are connected through to the output 437 of the sub-multiplexer 417.

Every picture line is formed of five-hundred and twenty-two 4-bit code words. The counter 428 is reset by the delayed line sync pulse DLSP at the input 421 which is generated by the clock supply. It opens the AND gate 429 for five-hundred and twenty-two word clocks. The counter 430 counts up to five. The signal for the input 418 is taken directly from the counter output. The signal SO and the signal for the output 436 are generated with the assistance of the sub-decoder 432 and of the exclusive OR gate 433. A signal SOa is present at the output of the AND gate 420 after ten clocks counted by the counter 430.

Figure 5:
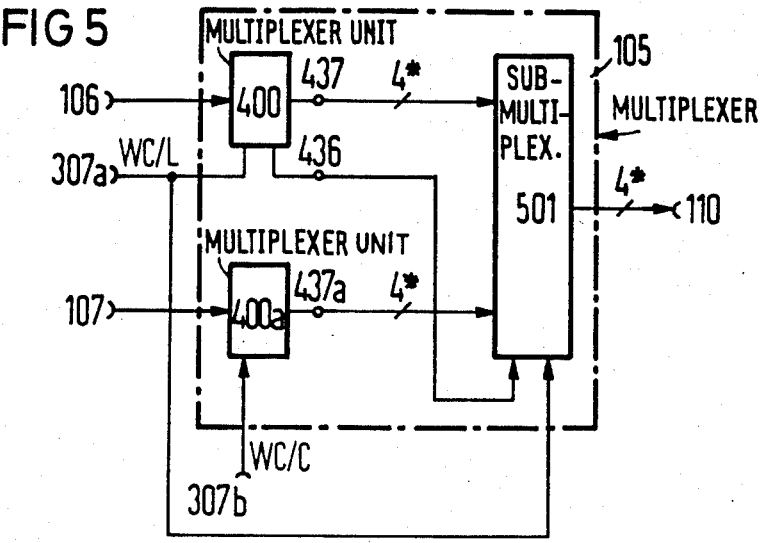
FIG. 5 shows a multiplexer in detail.

FIG. 5 shows a multiplexer 105 comprising a multiplexer unit 400 for luminance signals according to FIG. 4, a multiplexer unit 400a for chrominance color difference signals, and a sub-multiplexer 501 of the type 74LS399. This interlaces both signals, as shown in FIG. 2. The word clock for luminance WC/L is present at the input 307a, and the word clock for chrominance WC/C is present at the input 307b. Its frequency amounts to one-fourth the frequency of the word clock for luminance WC/L.

Figure 6:
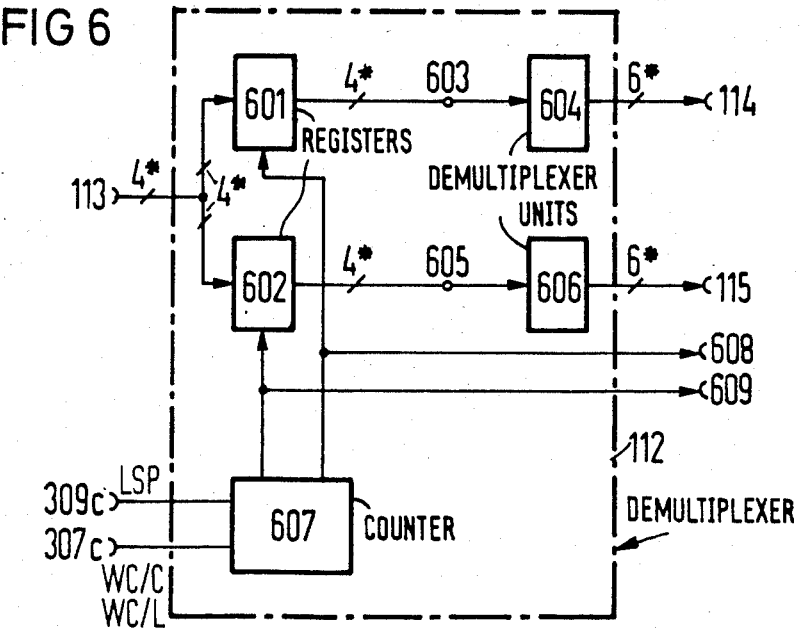
FIG. 6 shows a demultiplexer in detail.

FIG. 6 shows the demultiplexer 112. It contains registers 601 and 602 which respectively are formed of an integrated circuit 74LS175, a counter 607 counting to five which consists of integrated circuits 74LS163 and 74LS11, two demultiplexer units 604 and 606 that are shown in FIG. 7, and the outputs 608 and 609.

The terminals 309c for the line start sync pulses LSP and 307c for the word clock WC are connected to a receive-side clock supply.

A 4-bit code word is present at the input 113. The counter 607 now controls the registers 601 and 602 such that four code words of the luminance signal are successively transferred into the register 601 and then one code word of the chrominance color difference signal is transferred into the register 602. The two registers 601 and 602 thus separate the luminance and the chrominance color difference signal, so that the chrominance color difference signal can be output at the output 115 and the luminance signal can be output at the output 114.

FIG. 7 shows the demultiplexer parts 604 or 606. These contain registers 701 through 703, AND gates 704 through 707 composed of integrated circuits 74LS11, a buffer memory (Fifo) 708 composed of two integrated circuits TDC 1030 of the TRW Company, a controller 709 formed of a counter 74F163 and decoder 74F139, and a counter 710 formed of two integrated circuits 74LS161. The arrangement further contains a multiplexer 711 formed of two integrated circuits 74F153, a register 712 formed of an integrated circuit 74LS175, two AND gates 713 and 714 formed of integrated circuits 74LS08, NAND gate 715 formed of an integrated circuit 74LS00, a buffer memory (Fifo) 716 formed of three integrated circuits TDC 1030 of the TRW Company, an AND gate 717 formed of an integrated circuit 74LS11, and counters 718 and 719 respectively formed of three integrated circuits 74LS161.

Data deriving from a register 601/602 is present at the input 603/605 as 4-bit code words. The registers 701 through 703 respectively accept a 4-bit code word with the clock from the controller 709. After three word clocks thus twelve bits are present in parallel at the outputs of the registers 701 through 703. The controller 709 supplies the transfer of the pulses for registers 701 through 703.

The source coding supplies transmit-side code words having a length of three bits or six bits. In the illustrative embodiments, a 6-bit code word fundamentally begins with "111". With the assistance of the AND gates 704 through 707, three lines lying next to one another are respectively checked for the presence of the word "111". The result is transferred into the buffer memory (Fifo) 708 in addition to the twelve bits at the outputs of the registers 701 through 703. Following circuits are thus informed whether and at which locations 6-bit source code words are contained in the 12-bit code word which arises.

The counter 710 generates "Shift-In" pulses SI (write pulses) and "Shift-Out" pulses SO (read pulses) for the buffer memory 708. Its output is connected to the multiplexer 711. This dissects the 16-bit code words such that three respective information bits appear at its output. A fourth line signals whether the first three lines contain the word "111". When yes is signalled, this is the beginning of a 6-bit code word. The next 3-bit code word appearing at the output of the multiplexer 711 is then the second part of the 6-bit code word.

The circuit bounded by the broken line functions as follows: In case the aforementioned fourth information line contains the bit "1", the next "Shift-In" pulse for the buffer memory 716 is suppressed and the second part of the source code word is applied to its input. Either a 6-bit source code word "IIIxxx" or a 3-bit source code word "000xxx" is thus transferred into the buffer memory 716. Information bits are referenced with x.

The counter 718 generates the "Shift-In" pulses required for the buffer memory (Fifo) 716 and the counter 719 generates the "Shift-Out" pulses.

The outputs of the buffer memory 716 are connected to the input of a decoder 118 or 119.

FIG. 8 shows a code converter. This code converter is followed by a residual decoder known from the initially cited publications.

The arrangement contains a programmable read-only memory (PROM) 801, a NAND gate 803, and a counter 805 formed of two integrated circuits of the type 74LS161.

The 3-bit or 6-bit code words coming from the buffer memory 716 in FIG. 7 are present at the input 114/115. In addition, a signal which indicates whether a 3-bit or a 6-bit code word is on the six parallel lines of the input 114 or 115 is present at the input 116/117. The programmable read-only memory 801 decodes the 6-bit code word into the number of the corresponding following known and not illustrated quantizer stage, and is then emitted into the following circuit at the output 802. The signal at the input 116/117 opens the NAND gate 803 so that the counter 805 increments with the picture element clock at the input 806. The number of 6-bit code words already received in the current picture line is present at the output 807. The counter 805 is reset at the beginning of every line with a line sync pulse at the input 309c. The counter reading of the counter 805 is processed in an arrangement according to the lower half of FIG. 3. Proceeding from this arrangement, a switchover means in the following part of the decoder 118 or 119 is actuated.

Although various minor changes and modifications might be proposed by those skilled in the art, it will be understood that we wish to include within the claims of the patent warranted hereon all such changes and modifications as reasonably come within our contribution to the art.

We claim as our invention:

1. An arrangement for transmission of synchronous television composite signals separated into luminance and chrominance signals, comprising:
    coder means at a transmit side for converting the luminance and chrominance signals into variable-length code words;
    decoder means at a receive side for reconverting said variable-length code words;
    a multiplexer means at the transmit side controlled by said coder means for interlacing the luminance and chrominance signals in pulse frames which alternatingly contain at least one fixed location for the respective luminance or chrominance signal; and
    a demultiplexer means at the receive side for separating the luminance and chrominance signals.

2. An arrangement according to claim 1 including means for providing a sampling rate of the luminance signals which is a whole multiple m/n of a sampling rate of the chrominance signals; and means for selecting a pulse frame in which respective m bit luminance signals are followed by respective n bit chrominance signals.

3. In an arrangement for transmission of synchronous television composite signals separated into luminance and chrominance signals wherein coder means are provided at a transmit side for converting the luminance and chrominance signals into variable-length code words and decoder means are provided at a receive side for reconverting said variable-length code words, the improvement comprising:
    a multiplexer means at the transmit side controlled by the coder means for interlacing the luminance and chrominance signals in succeeding pulse frames in alternating fashion such that the respective signals are assigned to fixed locations; and
    a demultiplexer means at the receive side for separating the luminance and chrominance signals at the receive side.

* * * * *